United States Patent [19]
Livingston

[11] Patent Number: 5,157,857
[45] Date of Patent: Oct. 27, 1992

[54] FISHING APPARATUS INCLUDING ELECTRONIC DEVICES

[76] Inventor: Kent A. Livingston, 264 Indian Trail, Lake in the Hills, Ill. 60102

[21] Appl. No.: 656,862

[22] Filed: Feb. 19, 1991

[51] Int. Cl.⁵ ............................................. A01K 85/00
[52] U.S. Cl. ..................................... 43/17.6; 43/17.5; 43/17
[58] Field of Search .......................... 43/17, 17.5, 17.6

[56] References Cited

U.S. PATENT DOCUMENTS

| | | | |
|---|---|---|---|
| 3,213,562 | 10/1965 | Salvin | 43/17.6 |
| 3,940,868 | 3/1976 | Northcutt | 43/17.6 |
| 4,437,255 | 3/1984 | Reed | 43/17 |
| 4,486,969 | 12/1984 | Swenson | 43/17 |
| 4,748,760 | 6/1988 | Widmer | 43/17 |
| 4,748,761 | 6/1988 | Machovina | 43/17 |
| 4,760,664 | 8/1988 | Amendola | 43/17.5 |
| 4,763,433 | 8/1988 | Kulak | 43/17.6 |

FOREIGN PATENT DOCUMENTS

| | | | |
|---|---|---|---|
| 475984 | 10/1975 | U.S.S.R. | 43/17.5 |
| 1115693 | 9/1984 | U.S.S.R. | 43/17.5 |

*Primary Examiner*—Kurt Rowan
*Attorney, Agent, or Firm*—Leo J. Aubel

[57] ABSTRACT

Fishing apparatus including electronic circuitry for providing blinking LEDs and audio noises wherein charging capacitors and miniature batteries power the apparatus.

5 Claims, 11 Drawing Sheets

Fig. 15A  LED 72  1.5 VOLTS
Fig. 15B  LED 73  1.5 VOLTS
Fig. 15C  LEDS 72 & 73  3.0 VOLTS

Fig. 23

FISHING APPARATUS INCLUDING ELECTRONIC DEVICES

BACKGROUND OF INVENTION

The prior art includes fish attracting devices such as fishing lures or jigs which include lights, which produce wiggling actions, or which develop sounds that are intended to arouse the feeding instincts of fish and also bobbers which enable fisherman to fish in the dark more effectively. Miniature electric lights, piezo ceramic speakers, and small electric motors are some of the components that have recently been incorporated in such fishing devices. Such prior art devices and accessories conventionally include a source of power comprising miniature batteries such as watch batteries and hearing aid batteries. accordingly, it is one purpose of the present invention to provide an improved source of power for attracting or warning fishing devices such as lures, jigs, and bobbers. It is another purpose of the present invention to provide an improved fish attracting or warning device.

SUMMARY OF INVENTION

Fishing apparatus device including circuitry and apparatus for providing flashing lights and audio noises, and further including means for providing power to activate the lights and audio devices comprising miniature batteries and charging capacitors.

The foregoing features and advantages of the present invention will be apparent from the following more particular description of the invention. The accompanying drawings, listed hereinbelow, are useful in explaining the invention wherein.

BRIEF DESCRIPTION OF THE DRAWINGS

FIG. 1 is an isometric view showing the structure of a jig formed in accordance with the invention showing an LED (lights emitting diode) and including capacitors, FIG. 2 is an isometric view of the opposite side of the jig of FIG. 1, FIGS. 3 and 4 are isometric views of the jig of FIGS. 2 and 1 respectively showing the structure of FIGS. 1 and 2 encased or encapsulated in a housing or body and including a tail.

DESCRIPTION OF INVENTION

Figures 1, 2, 3, 4:
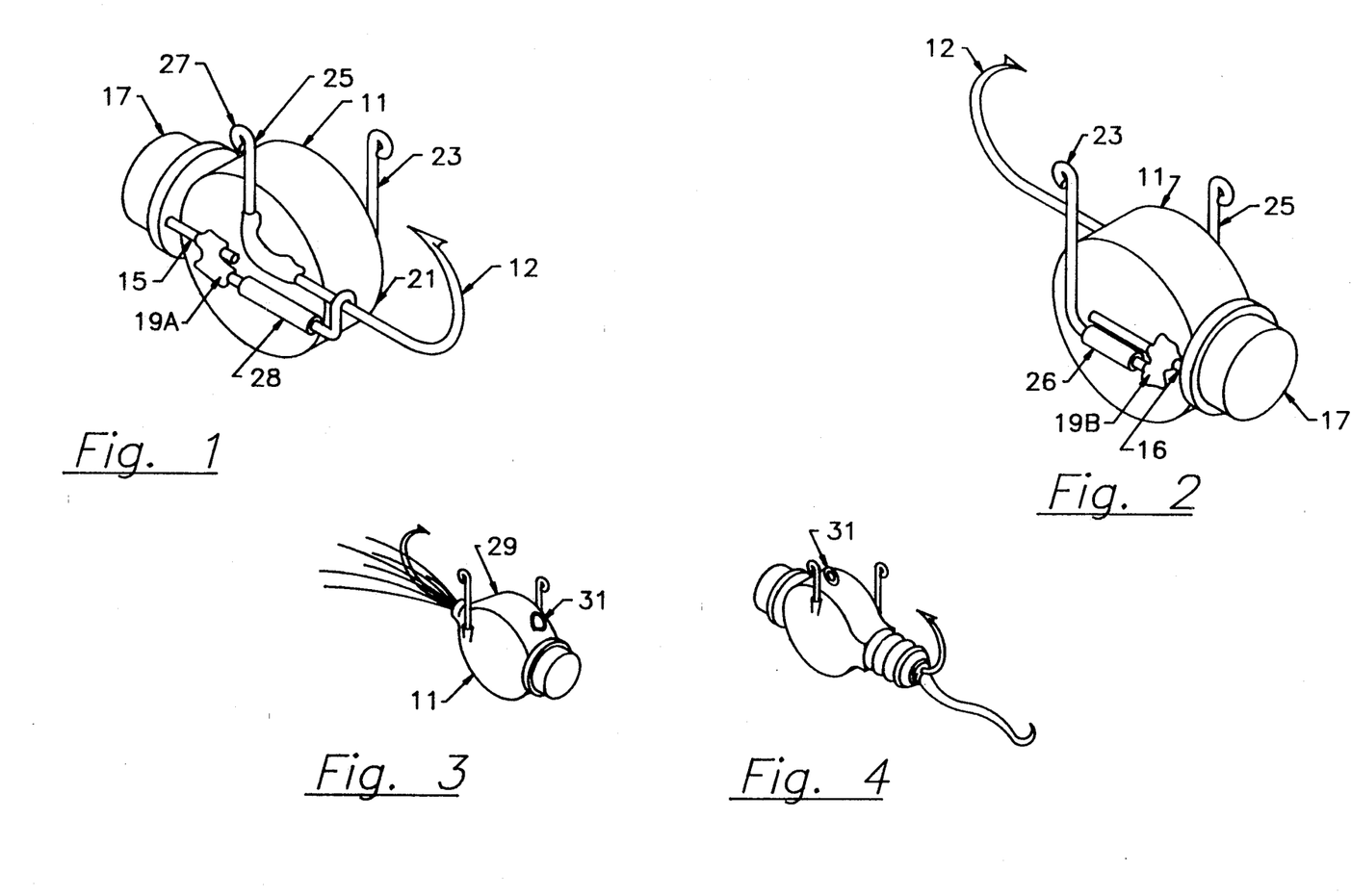

FIGS. 1 and 2 show a jig 11 formed in accordance with the invention. In FIGS. 1 and 2 the hook 12 portion of the jig 11, is affixed as by conductive adhesive, by soldering or by welding as at 19A to one terminal lead 15 of a blinking type LED (light emitting diode) 17, commonly available. A miniature, power providing device 21 is mounted and electrically connected between terminal lead 15 and the other terminal lead 16 of the diode 17 by the adhesive, solder or weld 19B. Power providing device 21 may comprise a miniature battery such as a commonly available watch battery. The power device 21 may also comprise a charging capacitor such as a double layer wet type capacitor commonly available.

Figure 8A:
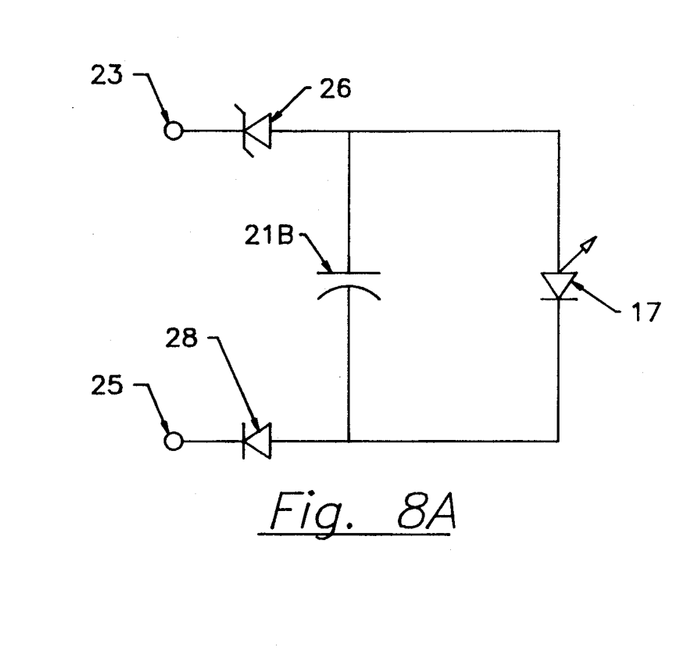
FIG. 8A and 8B are schematic diagrams of the electronic circuitry of the jigs and lures of FIGS. 1-7.
Figure 8B:
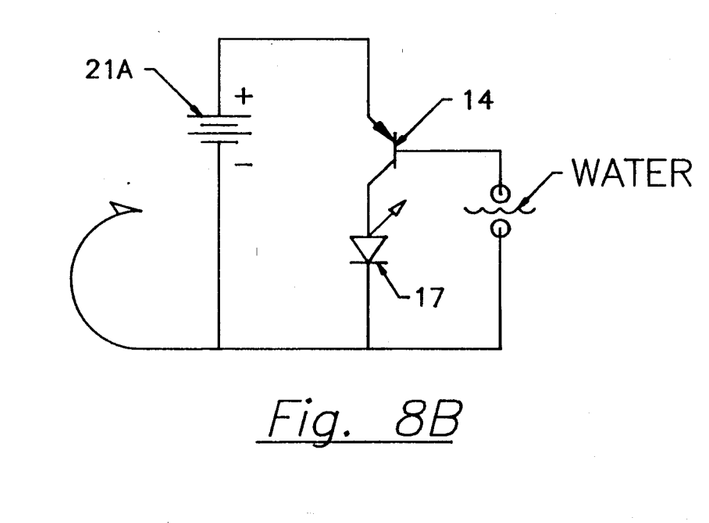

Referring briefly also to FIG. 8B, when a battery 21A is utilized as the electrical power source 21 a PNP switching transistor connected to the LED 14, see FIG. 8A. This is done to switch battery ON and OFF. More specifically, battery 21A is connected in series with the collector to emitter path of transistor 14 and LED 17. When the circuit is placed in the water, the base terminal of transistor biases transistor 14 to conduct by the circuit path extending through the water to the negative terminal of battery 21A, and hence switches battery 21A ON to power LED 17.

When a charging capacitor 21B is used as the power providing device 21, as in FIGS. 1A and 1B, a pair of electrically charging leads 23 and 25 are affixed to the capacitor 21B by the affixing means 19. In this embodiment a diode 28 is electrically connected in series with lead 25 to control the direction of the charging current to the capacitor. The other lead 30 of diode 28 is affixed as by adhesive, soldering or welding 31 to make electrical contact with capacitor device 21 and the lead 16 of LED 17. Lead 23 may be of slightly different length then lead 25 to distinguish the leads for purposes of contacting the proper terminal of a charging battery as will be described. A zener diode 26 connects to the positive contacting terminal 23 to provide a voltage drop for the circuit. The ends of leads 23 and 25 are formed into a loop such as at 27 for firmness and for ease of handling. Terminal leads 23 and 25 are spaced apart a selected distance to conform to the standard spacing between the positive and negative terminal of a standard type 9 volt battery, not shown. The method of charging the capacitor power source 21 will be described below.

FIGS. 3 and 4 show the jig 11 with the apparatus of FIGS. 1 and 2 enclosed in a body or housing 29 such as of colored plastic. Body 29 has a loop 31 formed at the end opposite the hook 12 for attaching to a fishing line.

In one embodiment the LED 17 is caused to flash or blink at about 3 hz. rate. LED 17 integrally incorporates the circuitry for effecting a blinking or flashing function. Electronic circuits for effecting a blinking action of a continuous light LED are also well known, however, utilizing the blinking LED 17 minimizes the size of jig 11.

Diode 28 assures that the capacitor 21B is properly charged; that is, it controls current flow in the right direction, and also assures that capacitor 21B maintains a charge in water; that is, the capacitor is not discharged through the water. In the 30 to 60 seconds capacitor 21B becomes fully charged and is ready for operation. The charge or capacitor 21B powers LED 17 which integrally includes a blinking circuit to turn LED 17 ON/OFF continuously. The charge on capacitor 21B can maintain LED 17 in this blinking condition for about 30 minutes.

Figure 5:
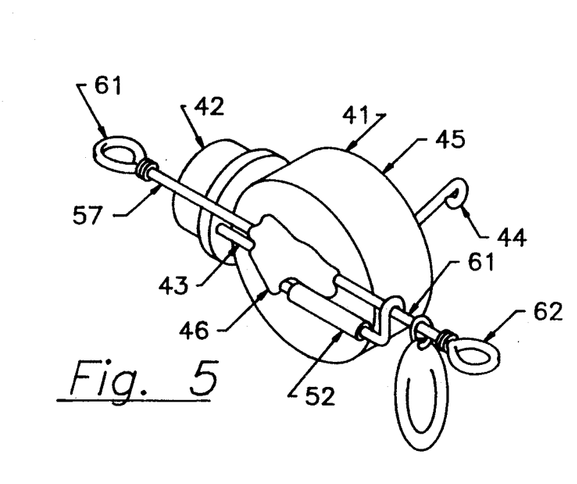
FIGS. 5 and 6 are isometric views of opposite sides of a fishing attractor.
Figure 6:
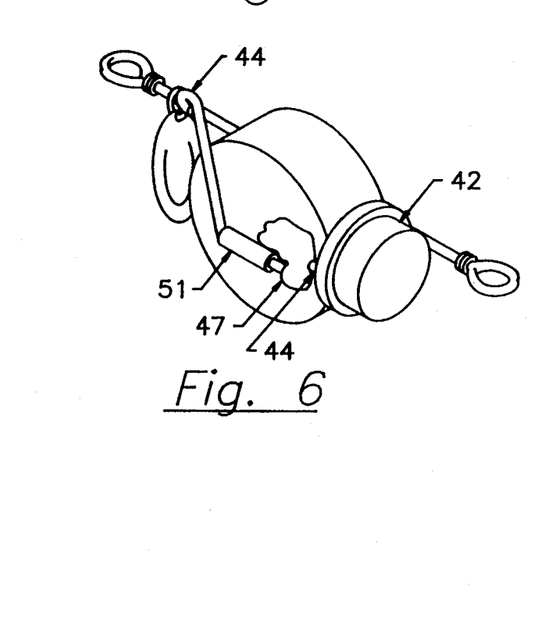
Figure 7:
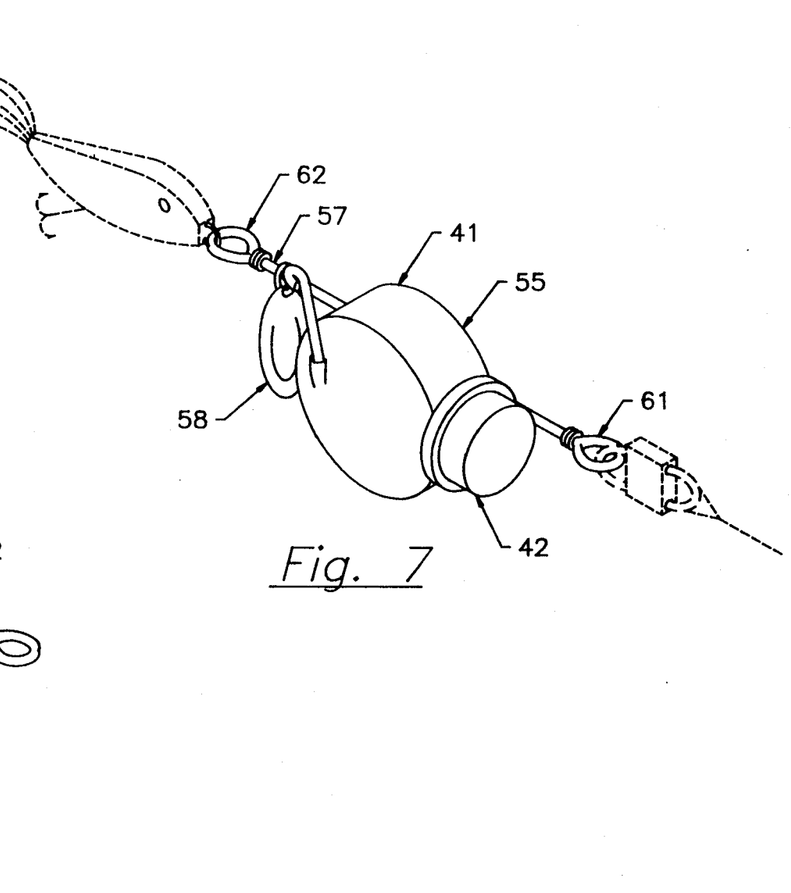
FIG. 7 is an isometric view of the attractor of FIGS. 5 and 6 encased or encapsulated in a housing or body and indicating how the attractor is used in fishing line and the attachment of an additional lure.

Refer now to FIGS. 5, 6, and 7 which show an attractor 41 which is of somewhat similar construction as the jig 11 of FIG. 1. Attractor 41 includes an LED 42 which has terminal leads 43 and 44 which straddle and are mounted on opposite sides of a charging capacitor 45, such as by soldering or welding indicated at 46 and 47. A diode 51 similar to diode 28 of FIG. 1 is provided to assure capacitor 45 is coupled to be charged in the proper polarity and is mounted to be connected in series with one plate of capacitor 45 and lead 44. Loop 62 on a wire segment 57 is formed close enough to lead 44 to permit contact to an external charging battery, not shown. A zener diode 52 similar in purpose to zener diode 28 is connected to lead 62. As shown in FIG. 7, attractor 41 includes a body 55 encasing a capacitor 45 and LED 42 similarly as body 29 is formed for the apparatus of FIG. 1. Terminal 44 and loop 62 function similarly as terminals 25 and 23 of FIG. 1 for charging capacitor 45. LED 42 functions similarly as LED 17 of FIG. 1.

The wire segment 57 having loops 61 and 62 at both ends is affixed to device 45, as by welding or soldering indicated at 46. A reflective plate 58 or other device may be hinged on segment 57. The attractor 41 is attached to the associated fishing line by engaging the loops 61 and 62 such as between a jig 65 and the line 66 connecting to the pole, not shown.

As mentioned above, FIGS. 8A and 8B show the electronic circuit used in the inventive apparatus jig 11 and attractor 41. As also mentioned above, and referring to FIG. 8A, terminals 23 and 25 are spaced apart about 0.5 inches to conform to the spacing of terminals of a charging battery. To charge capacitor 21B the terminal 23 is caused to make contact with the positive terminal of the charging battery and terminal 25 is caused to make contact with the negative terminal of the battery. In 30 to 60 seconds, the capacitor 21B is fully charged. Diode 28 assures that capacitor 21B is protected from being charged in a reverse polarity. LED 17 is a blinking type LED which begins blinking when capacitor 21B is charged and continues to blink until the capacitor dissipates its charge. It has been found that capacitor 21B will cause LED 17 to continue to blink for about 25 to 30 minutes.

Figure 9:
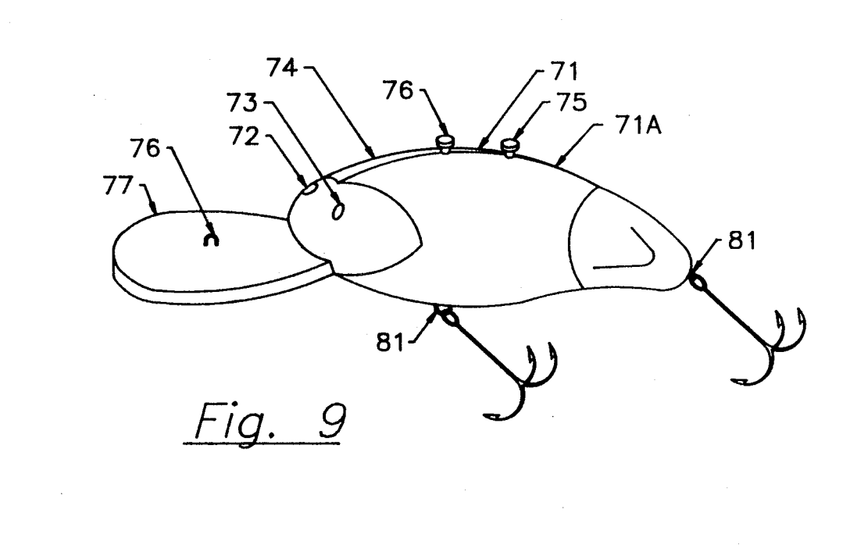
FIG. 9 is an isometric drawing of an inventive lure in accordance with the invention.
Figure 10:
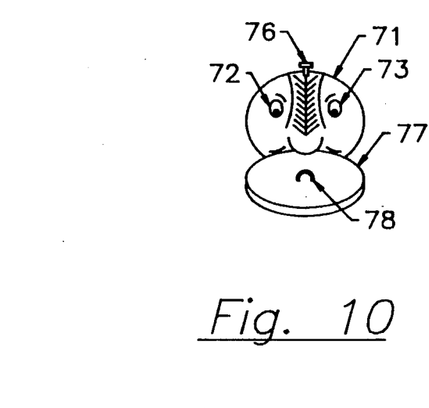
FIG. 10 is a front view of the lure of FIG. 9.
Figure 11:
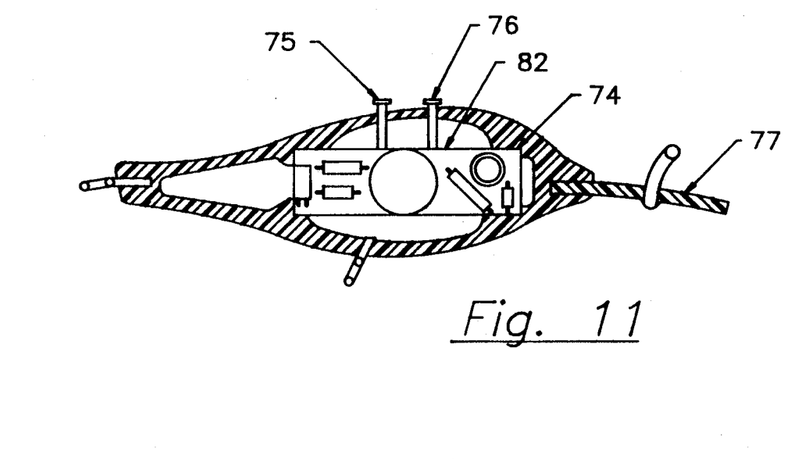
FIG. 11 is a view partly in cross section of the lure of FIG. 9, also showing a printed circuit board containing the electronic circuitry and the LEDs.

Refer now to FIGS. 9-11 which show a lure 71 in accordance with the invention. The lure 71 includes a pair of blinking LEDs 72 and 73 mounted in a position of the eyes of a fish on plastic fish-like body 74. The terminal leads 75 and 76 are similar in function and structure to terminal leads 23 and 25 of the jig 11 and also of attractor 41. A clear plastic plate 77 extends outwardly from the mouth of fish body 74 and includes a ring or hole 78 for attaching a fish line or other device. Ring 81 extends from fish body 74 to engage suitable hooks.

Figure 12:
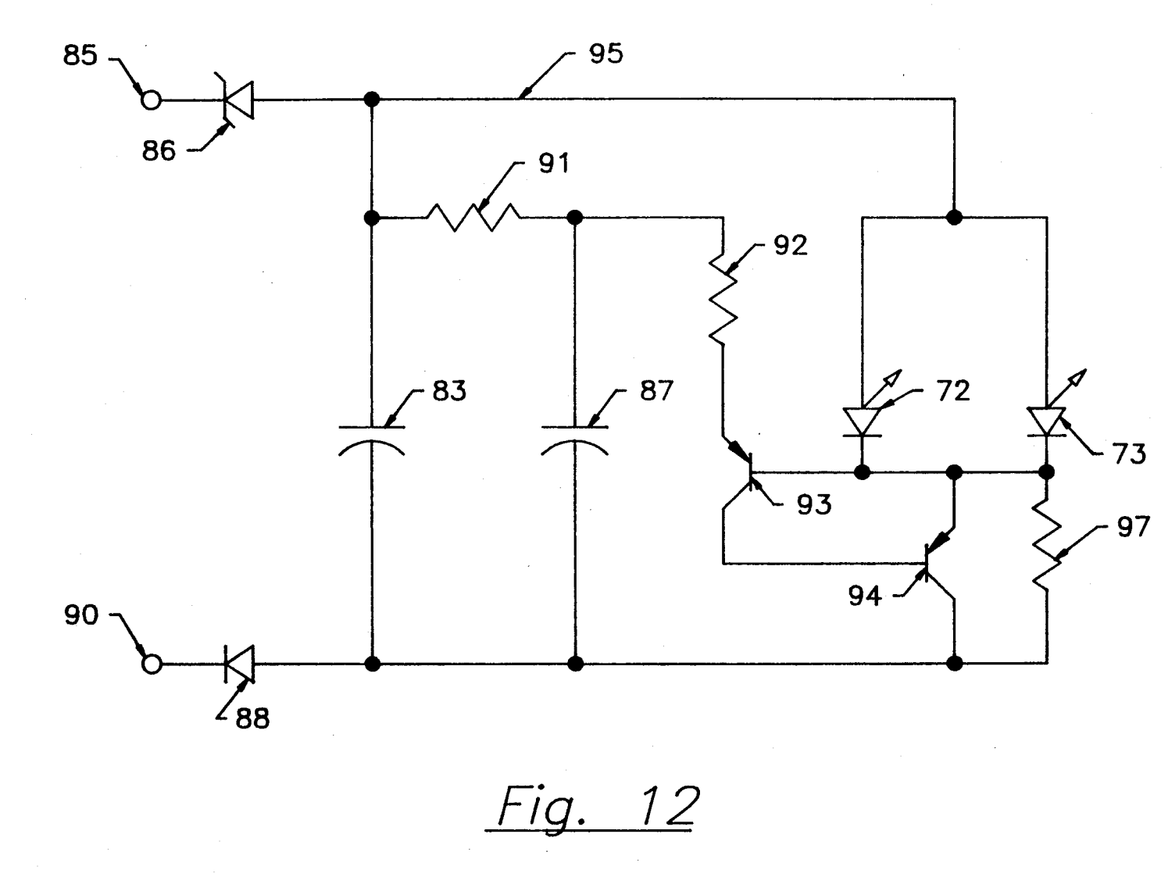
FIG. 12 is a schematic diagram of the electronic circuitry of the circuit board of FIG. 11.

The fish body 74 encases or encapsulates a printed circuit board 82, see FIG. 11 and 12, which includes electronic circuitry for controlling the operation of LEDs 72 and 73. A charging capacitor 87 is incorporated in the circuit. A zener diode 86 similar to zener diode 26 of FIG. 1 connects to the positive contacting terminal 85 to provide about 2.7 volt drop; and a diode 88 similar to diode 28 provides proper charging polarity. A small capacitor 83 is connected across the input terminals. A resistor 91 connects one plate (terminal) of capacitor 83 to one terminal of charging capacitor 87. The other terminals of capacitors 87 and 83 are connected to common reference lead 95. The junction of resistor 91 and capacitor 83 connect through resistor 92 to the emitter of a PNP transistor 93. The base of transistor 93 is connected to the cathodes of LEDs 72 and 73. The collector of transistor 93 is connected to the base of NPN transistor 94 which has its base connected to common reference, and its collector connected to the cathode of LEDs 72 and 73.

Lead 95 connects the junction of zener diode 86 to the anodes of LEDs 72 and 73 which are connected in parallel. The cathodes of LEDs 72 and 73 are connected to the base of transistor 94 and to a resistor 97, which is connected across transistor 94.

In operation and similarly to the jig of FIG. 1 and to the attractor 41 of FIGS. 5 and 6 the terminal 85 and 90 are caused to contact the charging battery. When capacitor 87 is charged LEDs 72 and 73 begin to blink. The circuitry of FIG. 12 is effective to provide a short ON time and a longer off time of the LEDs 72 and 73 and hence extends the number of minutes or period during which there is a continuous blinking operation of the LEDs after the capacitor 87 is charged.

Figure 13:
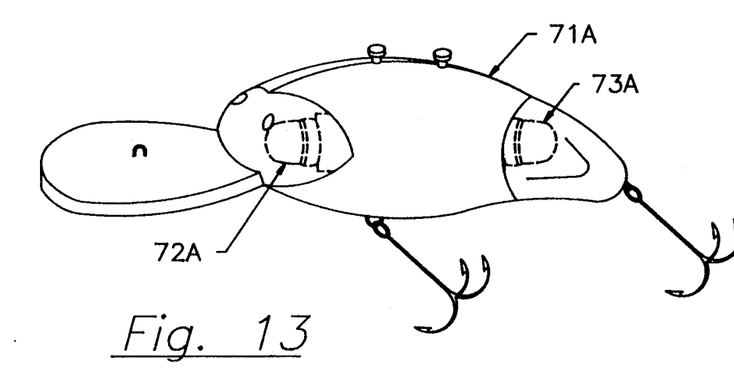
FIG. 13 is an isometric view of a lure in accordance with the invention.
Figure 14:
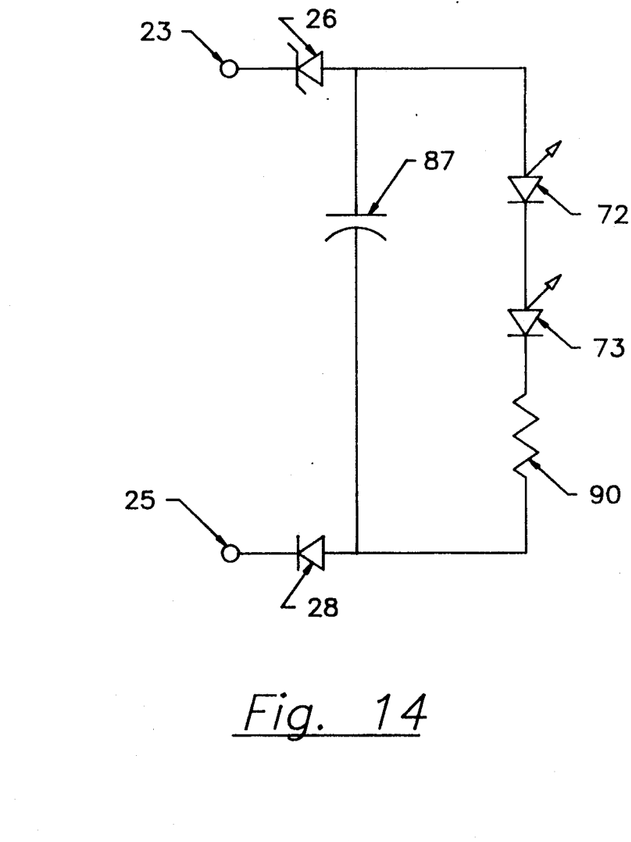
FIG. 14 is a schematic diagram of the electronic circuitry of the lure of FIG. 13, FIG. 15 are wave forms useful in explaining the operation of the circuitry of FIG. 14.

Refer now to FIG. 13 which shows a lure 71A similar to lure 71 of FIG. 9. In the lure 71A the LEDs 72A and 73A are mounted fore and aft; that is, longitudinally on the fish body or housing. The electronic circuitry for the lure of FIG. 13 is indicated in FIG. 14.

It has been found that connecting the two blinking LEDs 72A and 73A in series causes the LEDs to blink or be operable from the charged capacitor 87 for a longer period of time as compared to a single LED. For example, the charging 21B utilized for the single LED 17 of the jig 11 of FIGS. 3 and 4 will maintain the capacitor in an operable blinking condition for 30 minutes. In contrast, and quite interestingly, connecting two LEDS 72 and 73 in series as schematically depicted in FIG. 14 and using the same capacitor will cause the LEDs 72 and 73 to be in an operable blinking conditions for over 1 hour, even though LEDs 72 and 73 are similar to LED 17.

Figure 15A:
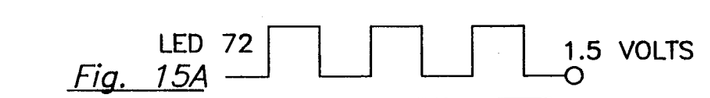
Figure 15B:
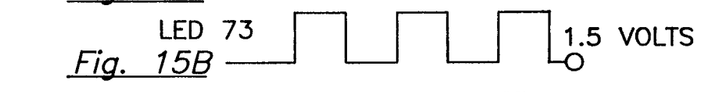
Figure 15C:
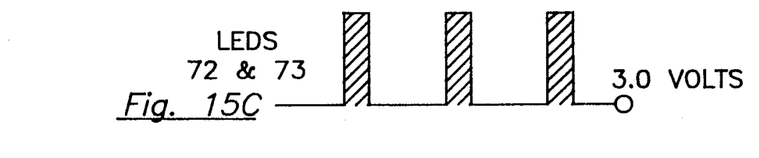

A possible explanation for the foregoing phenomena may be obtained from the waveforms of FIG. 15 such as would be obtained across resistor 90. Assume LEDs 72 and 73 have different ON and OFF times relative to each other. If only one LED was in the circuit waveforms (a) or (b) would be obtained. If the two LEDs are connected in series, the only time current will flow through the circuit is when both LEDs are ON at the same time. The foregoing features cuts the ON time of the LEDs by whatever portion does not fit the more narrow time window created by having both LEDs ON at the same time, and the waveform obtained would be as at (c). Because the LEDs are ON for a shorter time the total time period of blinking operation of the LEDs for a charging cycle of the capacitor is increased substantially.

Refer now to FIGS. 13-17 which show a first embodiment of fishing bobber 101 is accordance with the invention. Bobber 101 includes an outer body 102 such as of a plastic material formed in the shape of a foreshortened circular trapezoid. The body 102 includes an elongated vertical opening 103 extending through body 102 for receiving the component mounting board 106 including an LED 104 and an audio device 105 as will be explained. The terminals 108 and 109 on board 106 are similar in function and purpose to terminals 23 and 25 of the jig 11 of FIG. 11 extend outwardly of body 102. In operation bobber 101 is intended to float in the water in the orientation indicated in FIG. 18 with LED 104 and audio device 105 extending below the water for purposes to be explained.

Figure 16:
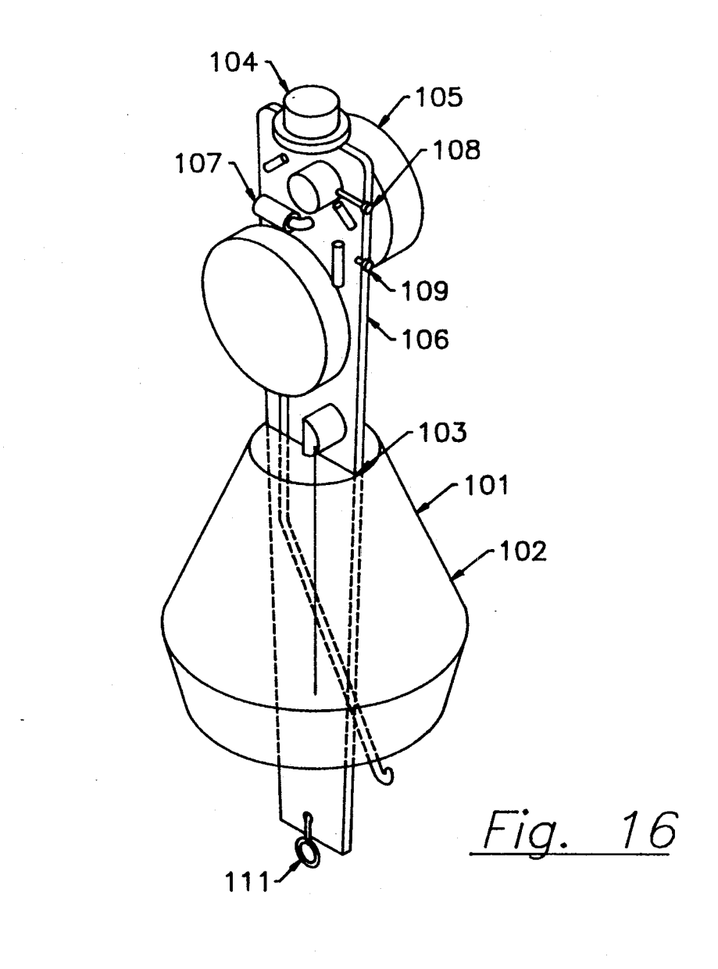
FIG. 16 is an isometric view of a first embodiment of a bobber in accordance with the invention.
Figure 17:
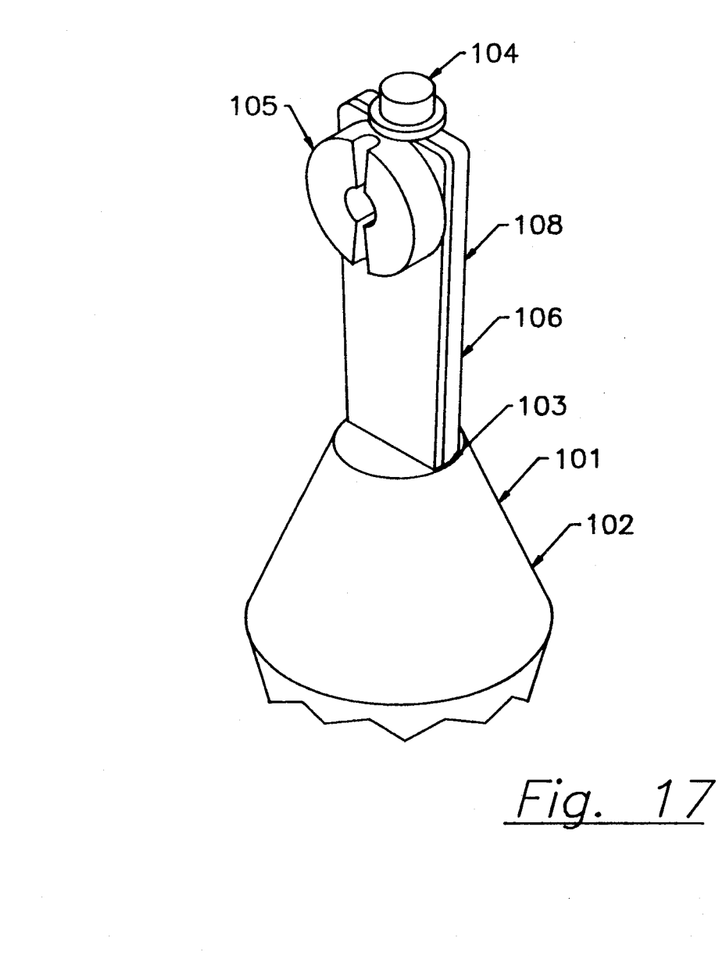
FIG. 17 is a view of the opposite side of the embodiment of the bobber of FIG. 13 more clearly showing an audio device.
Figure 18:
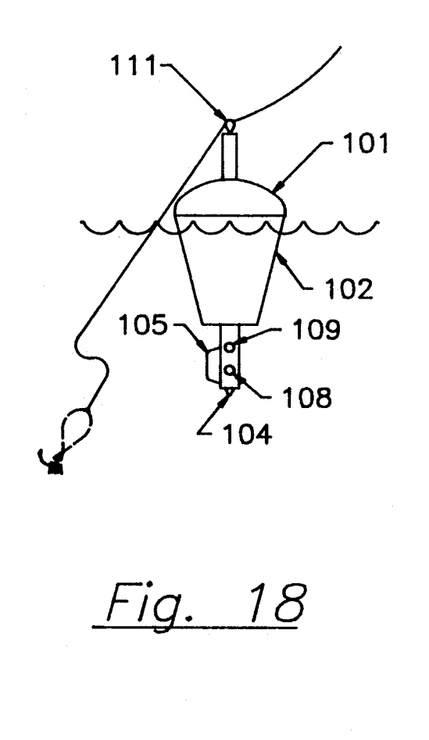
FIG. 18 shows the bobber of FIGS. 13 and 14 in a floating ready position.
Figure 19:
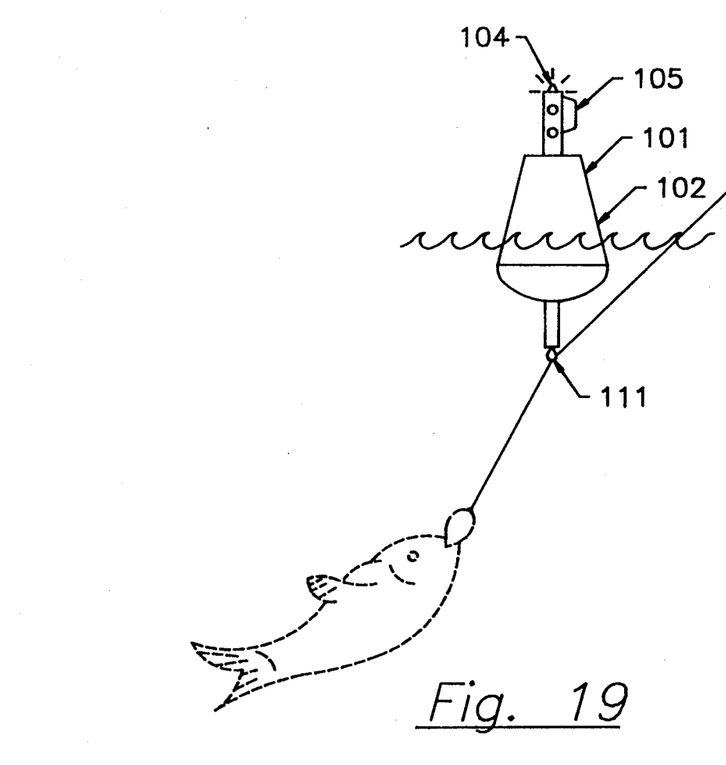
FIG. 19 shows the bobber vertically rotated 180°, and in position as when engaged by a fish.

Mounting board 106 is of a known composite material for mounting the electronic circuitry components which are essentially the same as the circuitry for jig 11 and are generally labeled as 107, the LED 104 and the audio device 105. LED 104 is mounted on the top of board 106, audio device 105 is mounted on the side of board 106 and adjacent the top of the board, and LED 104. The electronic circuitry components 107 are mounted on the side of the board and encapsulated by a plastic material 108. A loop 111 is suitable affixed to the bottom of board 106 for attaching such as to the fishing line.

In assembly, the electronic circuit components 107 are suitably mounted on board 106 and encapsulated in plastic indicated at 108. Next, the board 106 and included components 107 are inserted downwardly into recess 103 of body 102 and affixed thereto as by a suitable waterproof adhesive.

In operation, a jig or hook is affixed to loop 111 and the fishing line. The bobber 101 (with its capacitor previously charged as explained for jig 11 of FIGS. 1 and 2) will float on the water with the LED 104 and audio device 105 submerged. Blinking LED 104 will not be operating and the audio device 105 will not be operating. When a fish strikes, the hook (jig) will pull on loop 111 tipping or pulling over the bobber 101 to close a water activated switch 120 and activate the LED 104 and the noise device 105, see FIG. 17. The fisherman will be immediately advised visually and audibly that he has a fish on the line. Note that, basically switch 120 comprises two metallic terminals and when water is introduced between the terminals, the terminals are effectively electrically in contact.

Figure 20:
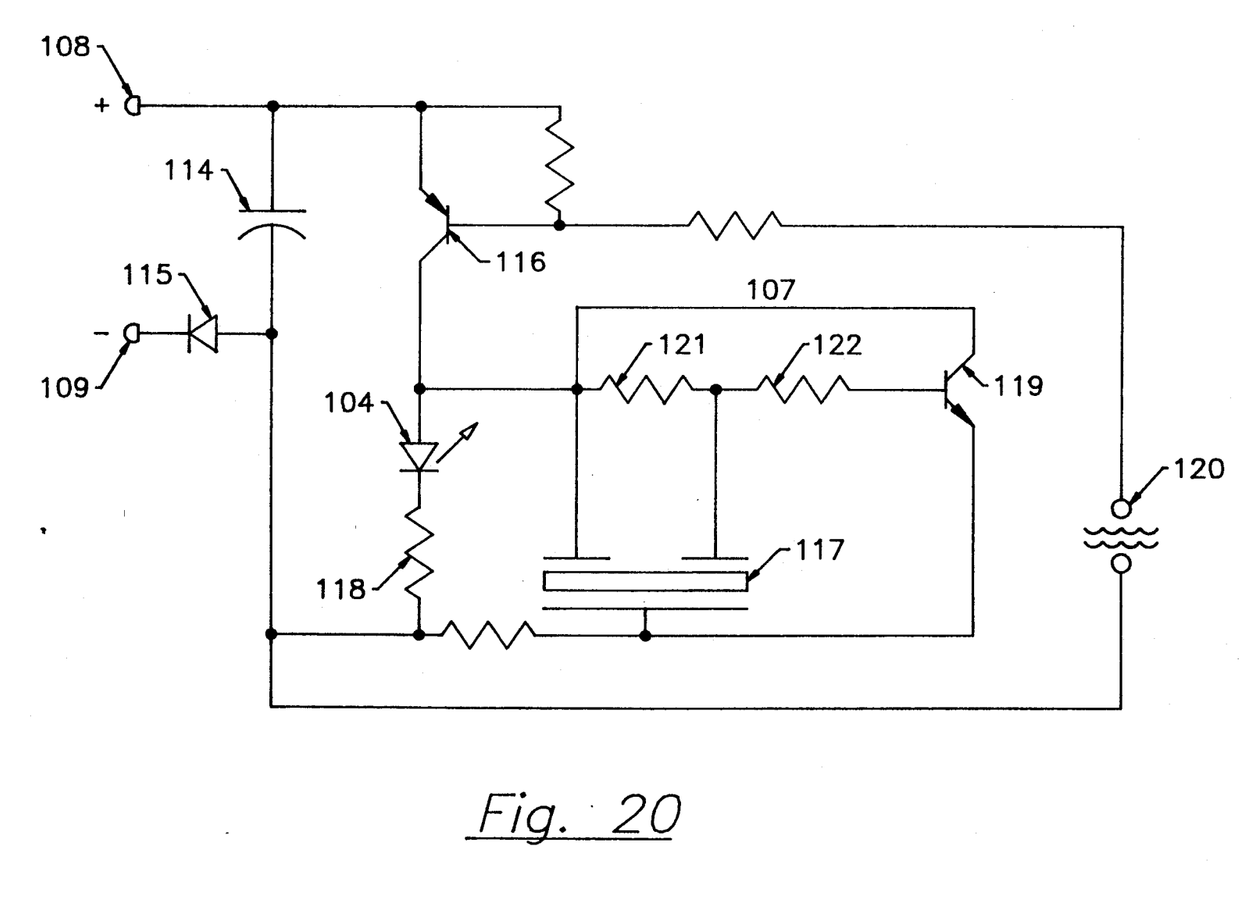
FIG. 20 shows electronic circuitry of the bobbers of the invention.

The electronic circuitry components 107 of bobber 101 are shown in FIG. 20. Terminals 108 and 109 are mounted similarly to terminals 23 and 25 of of jig 11 to charge capacitor 114 through diode 115 which function similarly to capacitor 21B and diode 28, respectively. Also, blinking LED 104 functions similarly to LED 17 of FIG. 8A.

When the bobber 101 is tipped over as by engaging a fish, a conducting path is provided by the water and switch 120 closes. Transistor 116 is caused to conduct to provide a circuit path for LED 104 to start blinking. Resistor 118 connected to the cathode of LED 104 reduces the current draw of LED 104. Concurrently, the audio device 117 (which is a commercially available device) is powered through transistor 116 to make an audio sound. Audio device 117 is a dual plate piezo device connected in a feedback circuit including transistor 119, resistors 121, 122, and lead 123 to provide chirping noises. Resistor 12 provides feedback type of resistance that places a potential on the piezo disk that distorts the disk at the frequency of the combined components.

As mentioned, switch 120 switches transistor 116 ON when the bobber 102 is tipped over into the water such as by a fish, to thereby activate the blinking LED 104 and audio device 117; and switch 120 turns transistor 116 OFF when the bobber 102 returns to its passive or non-fish position two twin LED 104 and audio device 107 OFF.

Figure 21:
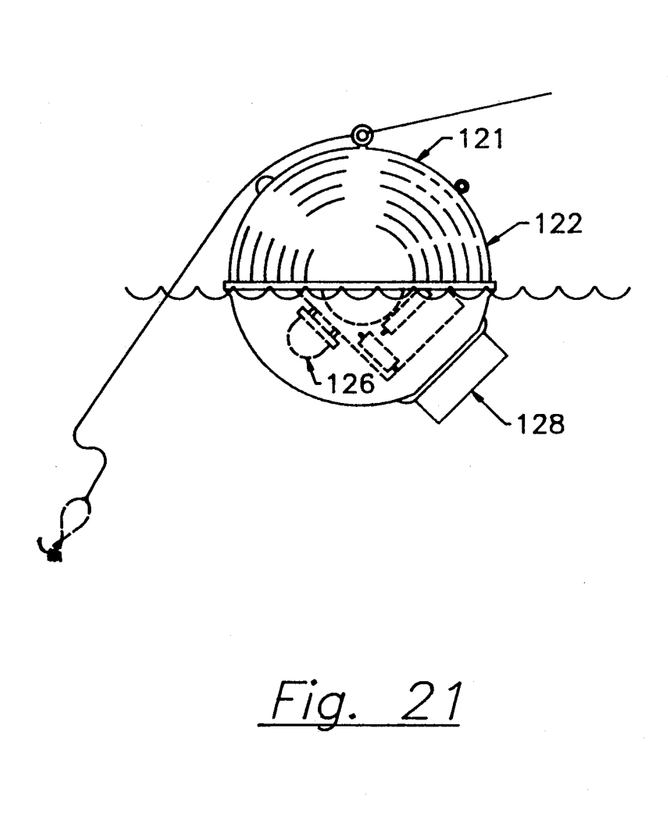
FIG. 21 is a side view of a second embodiment of a fishing bobber in accordance with the invention.
Figure 22:
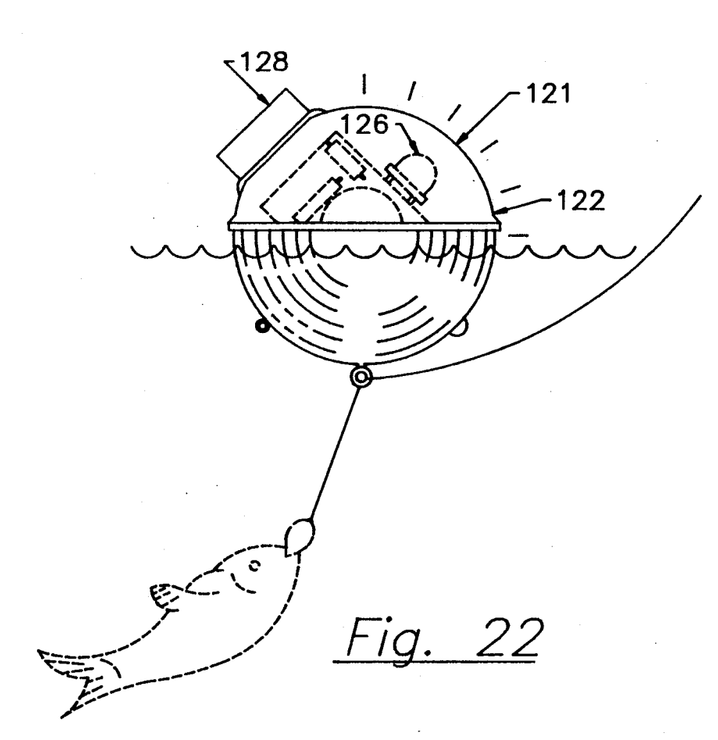
FIG. 22 is a side view of the bobber of FIG. 18 oriented or rotated 180° degrees from the view of FIG. 18, as when engaged by a fish.
Figure 23:
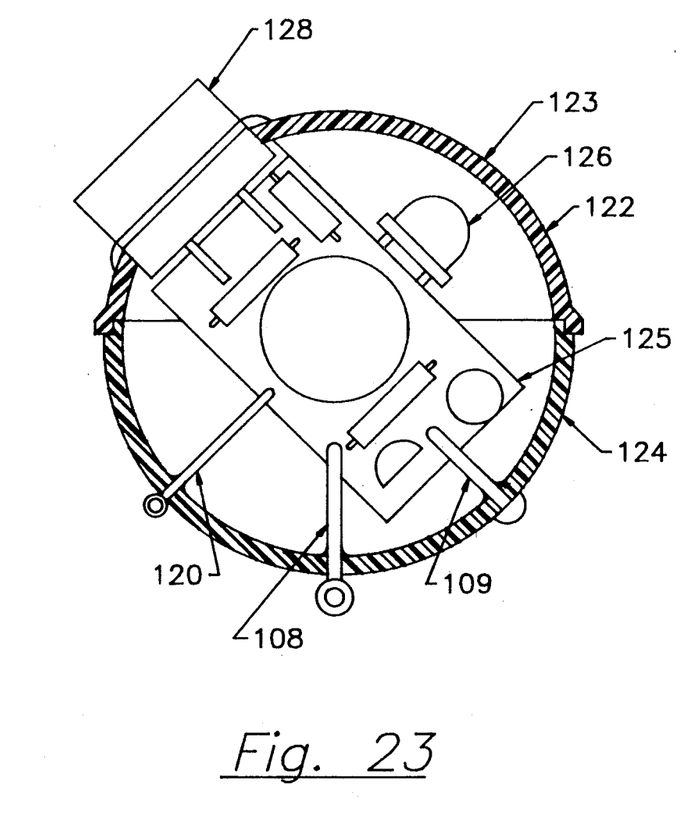
FIG. 23 is a cross sectional view of the internal structure of FIGS. 21 and 22.

FIGS. 21, 22, and 23 show a second embodiment of a bobber 121 which comprises a round plastic housing 122 formed of two similar halves 123 and 124. An electronic printed circuit board 125 including an LED 126 is mounted within housing 122 as by wire leads 120, 108, and 109, or by foam material. The audio device 128 mounted on housing as by adesive and to board 125 is positioned to extend outwardly of the housing 122 to convey an adequate sound. The operation of the bobber 121 is similarly to that of bobber 101 and is depicted in FIGS. 21 and 22. In bobber 121, the LED 126 is mounted within housing 122 and shines through the translucent plastic housing 122.

Although particular embodiments of the present invention have been described and illustrated herein, it should be recognized that modifications and variations may readily occur to those skilled in the art and that such modifications and variations may be made without departing from one spirit and scope of my invention. Consequently, my invention as claimed below may be practiced otherwise than as specifically described above.

I claim:

1. Fishing apparatus comprising in combination, LED means, circuitry means for causing said LEDs to blink ON and OFF, a charging capacitor means for providing electrical power said capacitor means having positive and negative terminals which selectivity caused to contact positive and negative terminals of an associated battery for a selected period of time to be charged to a voltage, and said capacitor being connected to power said circuit means and said LED means.

2. Apparatus as in claim 1 wherein said LED means comprises at least two LEDs connected electically in series whereby the LEDs can operate for a longer period on a given charge of said capacitor.

3. Apparatus as in claim wherein said circuitry means include a zener diode to prevent overcharging of the capacitor, and a diode to assure said capacitor is charged with the proper polarity.

4. Fishing apparatus comprising in combination LED means, audio device means, circuitry means for causing said LED means to blink ON and OFF and for activating said audio means, and an electrical power device comprising a charging capacitor which is chargeable to a voltage by temporarily touching the capacitor contacts to the contacts of an associated battery, and switch terminal means caused to be closed by immersion in water to activate said audio device.

5. Fishing apparatus comprising in combination, a housing, electronic devices mounted in said housing, said electronic devices being selectively activatable, and self contained power device means mounted in said housing, said power device means comprising a charging capacitor, electrical terminal means extending outside of said housing and connecting to said capacitor to enable said electrical terminal means to touch electrical terminals of an associated battery, whereby said capacitor may be charged within a short period of time, and said capacitor thereafter discharging to provide the sole operating electrical power for said electronic devices.

* * * * *

UNITED STATES PATENT AND TRADEMARK OFFICE
CERTIFICATE OF CORRECTION

PATENT NO. : 5,157,857
DATED : October 27, 1992
INVENTOR(S) : Kent A. Livingston It is certified that error appears in the above-indentified patent and that said Letters Patent is hereby corrected as shown below:

Column 6, line 46, claim 1, change "LEDs" to --LED means --.
    line 49, claim 1, before "selectively" insert --are --.
    line 52, claim 1, change "capacitor" to --capacitor means --.
    line 53, claim 1, change "circuit" to --circuitry --.
Column 6, line 57, claim 2, change "capacitor" to --capacitor means --.
    line 58, claim 3, before "wherein" insert --1 --.
    line 60, claim 3, both occurrences change "capacitor" to --capacitor means --.

Signed and Sealed this

Twenty-sixth Day of July, 1994

Attest:

BRUCE LEHMAN

*Attesting Officer*      *Commissioner of Patents and Trademarks*